United States Patent
Liu et al.

(10) Patent No.: US 11,441,201 B2
(45) Date of Patent: Sep. 13, 2022

(54) SUCKER ROD STEEL AND MANUFACTURING METHOD THEREFOR

(71) Applicant: BAOSHAN IRON & STEEL CO., LTD., Shanghai (CN)

(72) Inventors: Xiangjiang Liu, Shanghai (CN); Zongze Huang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 166 days.

(21) Appl. No.: 16/321,287

(22) PCT Filed: Aug. 25, 2017

(86) PCT No.: PCT/CN2017/099002
§ 371 (c)(1),
(2) Date: Jan. 28, 2019

(87) PCT Pub. No.: WO2018/041030
PCT Pub. Date: Mar. 8, 2018

(65) Prior Publication Data
US 2019/0169706 A1    Jun. 6, 2019

(30) Foreign Application Priority Data

Aug. 30, 2016   (CN) .......................... 201610784840.0

(51) Int. Cl.
*C21D 9/00*   (2006.01)
*C22C 38/22*   (2006.01)
(Continued)

(52) U.S. Cl.
CPC ............. *C21D 9/0075* (2013.01); *C21D 1/18* (2013.01); *C21D 1/58* (2013.01); *C21D 6/002* (2013.01);
(Continued)

(58) Field of Classification Search
None
See application file for complete search history.

(56) References Cited

U.S. PATENT DOCUMENTS

2015/0027598 A1   1/2015   Seng

FOREIGN PATENT DOCUMENTS

CN   1119878 A    4/1996
CN   102851610 A   1/2013
(Continued)

OTHER PUBLICATIONS

English language machine translation of JP-2011168865-A to Asahi et al. Generated Aug. 6, 2020. (Year: 2020).*

(Continued)

*Primary Examiner* — Brian D Walck
(74) *Attorney, Agent, or Firm* — Amster, Rothstein & Ebenstein LLP

(57) ABSTRACT

A sucker rod steel, a heat treatment process therefor, and a manufacturing method comprising the heat treatment process are provided. The sucker rod steel comprises, in mass percent, the following chemical elements: C: 0.10~0.20%, Si: 0.40~0.80%, Mn: 0.20~0.60%, Mo: 0.36~0.46%, Cr: 6.15~7.10%, Al: 0.015~0.035%, Nb: 0.02~0.06%, and N: 0.008~0.015%, with the balance being Fe and other inevitable impurities. The microstructure of the sucker rod steel is tempered martensite and nanoscale precipitates. The grain size is higher than grade 10, the tensile strength is 920~1320 Mpa, and the AKU2 impact energy is greater than or equal to 180 J.

12 Claims, 1 Drawing Sheet

(51) Int. Cl.
  *C22C 38/26* (2006.01)
  *C21D 1/18* (2006.01)
  *C21D 1/58* (2006.01)
  *C21D 6/00* (2006.01)
  *C22C 38/00* (2006.01)
  *C22C 38/02* (2006.01)
  *C22C 38/04* (2006.01)
  *C22C 38/06* (2006.01)

(52) U.S. Cl.
  CPC ............. *C21D 6/005* (2013.01); *C21D 6/008* (2013.01); *C22C 38/001* (2013.01); *C22C 38/02* (2013.01); *C22C 38/04* (2013.01); *C22C 38/06* (2013.01); *C22C 38/22* (2013.01); *C22C 38/26* (2013.01); *C21D 2211/004* (2013.01); *C21D 2211/008* (2013.01)

(56) References Cited

FOREIGN PATENT DOCUMENTS

| | | | |
|---|---|---|---|
| CN | 105624562 A | | 6/2016 |
| EP | 0688883 A1 | | 12/1995 |
| JP | 2011168865 A | * | 9/2011 |

OTHER PUBLICATIONS

International Search Report for PCT/CN2017/099002 dated Nov. 23, 2017.

* cited by examiner

SUCKER ROD STEEL AND MANUFACTURING METHOD THEREFOR

RELATED APPLICATIONS

This application is a national phase of International Application No, PCT/CN2017/099002 FILED Aug. 25, 2017, which claims priority from Chinese Patent Application No. 201610784840.0 filed on Aug. 30, 2016, both incorporated by reference in their entireties.

TECHNICAL FIELD

The present invention relates to a steel material and a manufacturing method thereof, and more particularly to a steel material for petroleum oil pumping apparatus and a manufacturing method thereof.

BACKGROUND ART

Mechanical oil extraction is the main means of oil-field development, and the rod pumping system plays an important role in the mechanical oil extraction. The sucker rod is an important part of the rod pumping equipment. The sucker rod has the function of transmitting the power of the pumping unit to the downhole oil pump and extracting petroleum through the oil well pipe.

At present, the main steel grades of sucker rods at home and abroad are as follows: 35Mn2, 35CrMo, 42CrMo steel and the like used in D-grade rods; D-grade sucker rods 1536 and 4142 (equivalent to 35Mn2 and 42CrMo steel, respectively) recommended by American Petroleum Institute; 12Mn2SiCr, 16Mn2SiCr, 20Cr2MoNi steel and the like mainly used in the manufacture of H-grade rods. A large number of practical applications have shown that although the H-grade sucker rod has higher strength, its service life is not necessarily higher than that of the D-grade rod. The reason is that although the fatigue strength and wear resistance of the sucker rod are improved with the improvement of the strength of the steel, the corrosion resistance and corrosion fatigue resistance of the sucker rod under the conditions of oil well corrosive medium such as $CO_2$, $H_2S$ and $Cl^-$ have not been improved. Moreover, the increase in strength of the sucker rod steel is often accompanied by a decrease in toughness, resulting in an increased probability of early sudden breakage of the sucker rod.

At present, in the prior art, sucker rod steel is often produced by microalloying, that is, by adding Nb, V, TI or B elements. However, the microalloyed sucker rod steel cannot sufficiently exert its performance due to the immature heat treatment process of sucker rod steel (The heat treatment is carried out in flame furnace or electric resistance furnace. For the sucker rod, such heat treatment process tends to cause uneven heating and unstable structure, which affect the service life of the sucker rod).

The Chinese patent document titled "Novel sucker rod" with a publication number of CN102839332A and a publication date of Dec. 26, 2012 disclosed a novel sucker rod. The sucker rod is made of high-performance alloy steel material, and the high-performance alloy steel material comprises the following main components in a percent content: C: 0.12%~0.18%, Si: 0.45%~0.85%, Mn: 2.2%~3.2%, Cr: 1.0%~1.4%, Ni: 0.1%~0.3%, Al: 0.12%~0.3%, Co: 0.06%~0.12%, B: 0.001%~0.004%, with the balance being Fe. Although the patent document asserted that better corrosion resistance and oxidation resistance were obtained, there is no specific property or detailed heat treatment method described in the patent documents.

SUMMARY OF THE INVENTION

One of the objects of the present invention is to provide a sucker rod steel which has excellent overall performance, high tensile strength and greatly improved impact toughness.

Based on the above object, the present invention provides a sucker rod steel, comprising the following chemical elements in mass percent: C: 0.10~0.20%, Si: 0.40~0.80%, Mn: 0.20~0.60%, Mo: 0.36~0.46%, Cr: 6.15~7.10%, Al: 0.015~0.035%, Nb: 0.02~0.06%, and N: 0.008~0.015%, with the balance being Fe and other inevitable impurities.

The microstructure of the sucker rod steel is tempered martensite and nanoscale precipitates.

In the present technical solutions, other inevitable impurities mainly refer to P and S, and the mass percent thereof can be controlled as: P≤0.02%, S≤0.02%.

The design principle of each chemical element of the sucker rod steel according to the present invention is as follows:

C: Carbon is the main element for increasing the strength of steel. To ensure the strength, a certain amount of carbon is required. However, carbon is unfavorable for plasticity. Moreover, carbon greater than 0.20 mass % is unfavorable for weldability. Therefore, the mass percent of carbon according to the present invention is controlled to 0.10~0.20% to ensure that the steel has sufficient strength while having good toughness and weldability.

Si: Silicon can significantly increase the strength of ferrite, change the morphology, amount and size of carbide precipitation during tempering, improve the tempering stability of steel, and indirectly promote precipitation strengthening. Silicon has an adverse effect on the plasticity and toughness of steel to some extent. However, silicon can promote the redistribution of carbon in the phase transformation process and improve the stability of retained austenite, thereby improving the toughness. In the sucker rod steel according to the present invention, controlling the mass percent of silicon to 0.40~0.80% can exert the effect of solid solution strengthening while improving the toughness.

Mn: Manganese acts as a solid solution strengthening element, and meanwhile reduces the phase transition temperature of austenite-ferrite and effectively improves the hardenability of steel. However, manganese has the disadvantage of promoting austenite grain growth in steel. Therefore, in the present invention, the mass percent of manganese is controlled to 0.20~0.60%.

Mo: Molybdenum can strongly delay ferrite transformation and significantly improve the hardenability of steel. It can reduce the temper brittleness of steel, improve the heat treatment process performance, and improve the fatigue performance of steel. Molybdenum can reduce the activity of hydrogen in steel, greatly reduce the hydrogen absorption tendency of steel, and reduce the hydrogen storage trap in steel. Corrosive media in oil fields (high concentration of $Cl^-$, $Na^+$, $K^+$, $HCO_3^-$, $Mg^{2+}$, $SO_4^{2-}$, $Mg^{2+}$, $Ca^{2+}$ in oil fields) often cause hydrogen induced cracking. In this case, by adding molybdenum in a mass percent of 0.36~0.46%, the hydrogen absorption tendency of the steel can be effectively improved and the corrosion resistance can be improved.

Cr: Chromium is the most important key alloying element in the steel of the present invention. It is generally believed that chromium in a mass percent of 12% or more can impart good oxidation resistance and corrosion resistance to the steel, and improve the heat resistance of the steel. Chromium is the main alloying element of stainless steel and heat resistant steel. In addition, Chromium element can improve wear resistance and hardness, while excessive chromium is unfavorable for plasticity and weldability. For corrosive media in oil fields (high concentration of ions such as $Cl^-$, $Na^+$, $K^+$, $HCO_3^-$, $Mg^{2+}$, $SO_4^{2-}$, $Mg^{2+}$, $Ca^{2+}$ and the like in oil fields), the addition of chromium can improve corrosion resistance. Meanwhile, in consideration of the matching of the weldability and the microalloying effect, the mass percent of chromium of the sucker rod steel according to the present invention is controlled to 6.15~7.10%.

Al: Aluminum is a microalloying element added in the present invention and plays a key role in the formation of nanoscale precipitates in the sucker rod steel of the present invention. Part of Al forms AlN particles with N. Thus, the Al content is controlled to 0.015~0.035%.

N: Nitrogen is a microalloying element added in the present invention and plays a key role in the formation of nanoscale precipitates in the sucker rod steel of the present invention. The precipitate is a carbonitride, which plays an important role in improving the performance of the sucker rod steel of the present invention. In addition, N(C) and Nb form nanoscale Nb(CN) particles. When the billet is reheated, the undissolved Nb(CN) particles can prevent the growth of austenite grains. Therefore, the mass percent of nitrogen in the sucker rod steel of the present invention is controlled to 0.008~0.015%.

Nb: Niobium can significantly increase the recrystallization temperature of steel, so that the non-recrystallization controlled rolling of steel can be carried out in a higher and larger heat deformation temperature range, thereby promoting grain refinement and improving the toughness of steel. Therefore, the mass percent of niobium according to the present invention is controlled to 0.02~0.06%.

S and P: In the technical solution of the present invention, sulfur and phosphorus are inevitable impurities. The contents of sulfur and phosphorus should be reduced as much as possible under permissible technical conditions to reduce the segregation at grain boundaries of primiary austenite and improve the toughness. The contents of residual elements and gas are controlled at a considerably low level, so that the steel has a considerably high purity, and carbon element and each element dissolved in the austenite achieve desired optimum ratios, which lays a foundation for improving the uniformity and toughness of the material. Therefore, in the sucker rod steel of the present invention, the mass percent of sulfur and phosphorus is controlled to: sulfur≤0.020%, and phosphorus≤0.020%.

The microstructure of the sucker rod steel is tempered martensite and nanoscale precipitates. In the technical solution, the microstructure of the sucker rod steel is controlled by controlling the composition and the process of the steel, thereby improving the performance of the sucker rod steel and further improving the service life of the sucker rod steel.

Further, in the sucker rod steel according to the present invention, the precipitates include granular precipitates.

Further, in the sucker rod steel according to the present invention, the granular precipitates have a particle size of 10~20 nm.

Further, in the sucker rod steel according to the present invention, the granular precipitates include carbonitrides of Cr, Mn and Nb.

Further, in the sucker rod steel according to the present invention, the precipitates include short rod-shaped precipitates.

Further, in the sucker rod steel according to the present invention, the short rod-shaped precipitates have a length of 60~80 nm and a width of 10~20 nm.

Further, in the sucker rod steel according to the present invention, the short rod-shaped precipitates include carbonitrides of Cr and Fe.

Further, the sucker rod steel of the present invention has a grain size higher than grade 10.

Further, the sucker rod steel of the present invention has a tensile strength of 920~1320 MPa and an AKU2 of 180 J or more.

Moreover, another object of the present invention is to provide a heat treatment process of the sucker rod steel described above, comprising the steps of:

induction hardening: passing the sucker rod steel through an intermediate frequency induction heater to heat the sucker rod steel to 850~950° C. and keep for a holding time of 1~5 min, then cooling the sucker rod steel by oil quenching at an oil temperature of 20~50° C.;

induction tempering: passing the sucker rod steel through an intermediate frequency induction heater to heat the sucker rod steel to 520~650° C. and keep for a holding time of 1.5~5 min, then air cooling the sucker rod steel to room temperature.

The heat treatment process of the present invention obtains a large number of nanoscale precipitates by induction hardening and induction tempering with appropriate chemical ratio, thereby improving the microstructure of the steel and improving the service life of the sucker rod.

Further, in the heat treatment process of sucker rod steel according to the present invention, in the step(s) of induction hardening and/or induction tempering, passing the sucker rod steel through an intermediate frequency induction heater with a frequency of 20~30 KHz at a speed of 0.5~1 m/min.

Further, another object of the present invention is to provide a method for manufacturing sucker rod steel, comprising the heat treatment process as described above.

The microstructure of the sucker rod steel of the present invention is tempered martensite and nanoscale precipitates. Therefore, the sucker rod steel having a microstructure of tempered martensite and nanoscale precipitates, a grain size higher than grade 10, a tensile strength of 920~1320 MPa, and an AKU2 impact energy of 180 J or more was obtained. The sucker rod steel has a balanced overall performance.

In addition, the sucker rod steel of the present invention has corrosion resistance and is particularly suitable for oil wells in complicated conditions, such as complicated oil wells having high concentrations of chloride ions and carbonate ions and high salinity content.

The heat treatment process of sucker rod steel and the method for manufacturing sucker rod according to the present invention also have the above advantages.

DETAILED DESCRIPTION

Figure 1:
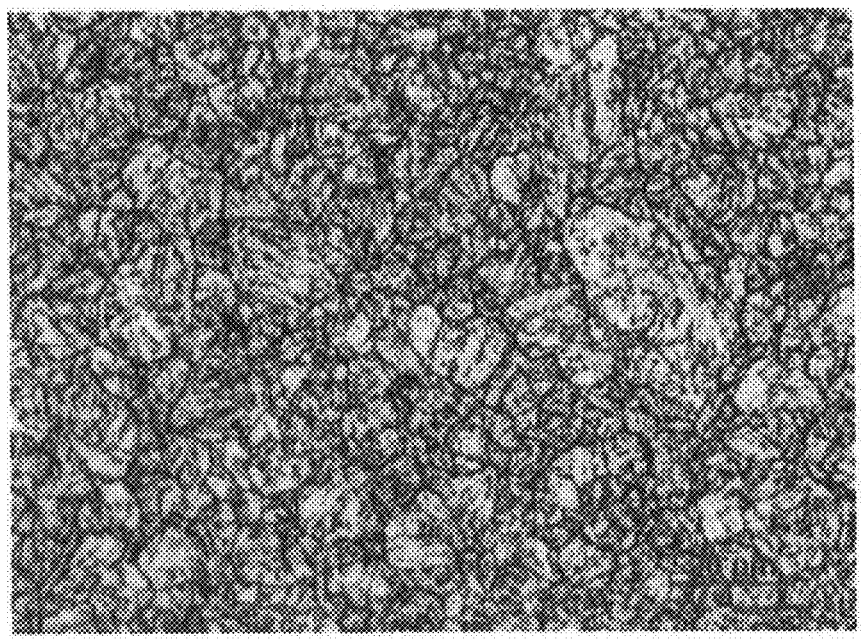
FIG. 1 is a photograph showing the metallographic structure of the sucker rod steel of Example A5.

The sucker rod steel and the manufacturing method thereof according to the present invention will be further explained and illustrated below with reference to the accompanying drawings and specific Examples. However, the explanations and illustrations do not unduly limit the technical solutions of the present invention.

Examples A1~A9

The sucker rod steels of Examples A1~A9 were prepared by the following steps:

(1) smelting: the mass percent of each chemical element is as shown in Table 1, primary smelting was carried out by using a converter or an electric arc furnace, after the primary smelting, external refining, vacuum refining RH or VD was carried out by ladle furnace, and then continuous casting or die casting was carried out to obtain a rough slab;

(2) The rough slab was hot processed and rolled into the sucker rod steel by a rolling mill;

(3) The sucker rod steel from step (2) was subjected to a heat treatment process, wherein the process specifically includes: induction hardening: passing the sucker rod steel through an intermediate frequency induction heater to heat the sucker rod steel to 850~950° C. and keep for a holding time of 1~5 min, then cooling the sucker rod steel by oil quenching at an oil temperature of 20~50° C.; induction tempering: passing the sucker rod steel through an intermediate frequency induction heater to heat the sucker rod steel to 520~650° C. and keep for a holding time of 1.5~5 min, then air cooling the sucker rod steel to room temperature.

Wherein, in the induction hardening step and the induction tempering step, the sucker rod steel passed through the intermediate frequency induction heater at a speed of 0.5 m/min, and the intermediate frequency induction heater is a hollow copper pipe with a frequency of 20~30 KHz. In addition, in the induction hardening step and the induction tempering step, an infrared induction temperature measurement system was used for temperature control.

It should be noted that when the sucker rod steel is rolled, it may be rolled into a bar or a wire rod according to the specific conditions of each Example.

Table 1 lists the mass percent of each chemical element in the sucker rod steel of each Example.

TABLE 1

(wt %, the balance is Fe and other inevitable impurity elements other than P and S)

| Example | C | Mn | Si | Cr | Al | Mo | S | P | Nb | N |
|---|---|---|---|---|---|---|---|---|---|---|
| A1 | 0.1 | 0.47 | 0.43 | 6.5 | 0.028 | 0.36 | 0.002 | 0.018 | 0.02 | 0.009 |
| A2 | 0.19 | 0.57 | 0.57 | 6.15 | 0.035 | 0.39 | 0.02 | 0.02 | 0.03 | 0.012 |
| A3 | 0.13 | 0.49 | 0.7 | 6 | 0.015 | 0.39 | 0.01 | 0.009 | 0.06 | 0.008 |
| A4 | 0.11 | 0.4 | 0.68 | 7.1 | 0.028 | 0.4 | 0.015 | 0.007 | 0.06 | 0.015 |
| A5 | 0.16 | 0.2 | 0.8 | 6.78 | 0.029 | 0.45 | 0.008 | 0.008 | 0.04 | 0.012 |
| A6 | 0.19 | 0.6 | 0.48 | 6.99 | 0.038 | 0.38 | 0.002 | 0.006 | 0.03 | 0.015 |
| A7 | 0.2 | 0.25 | 0.66 | 6.97 | 0.018 | 0.46 | 0.018 | 0.017 | 0.05 | 0.014 |
| A8 | 0.18 | 0.36 | 0.78 | 6.89 | 0.029 | 0.39 | 0.016 | 0.017 | 0.04 | 0.013 |
| A9 | 0.19 | 0.38 | 0.42 | 6.99 | 0.032 | 0.44 | 0.017 | 0.01 | 0.05 | 0.01 |

Table 2 lists the specific process parameters of the manufacturing method of the Examples.

TABLE 2

| Example | Temperature of induction hardening (° C.) | Holding time of induction hardening (min) | Cooling temperature of oil quenching (° C.) | Heating temperature of induction tempering (° C.) | Holding time of induction tempering (min) |
|---|---|---|---|---|---|
| A1 | 950 | 2.5 | 35 | 570 | 2.5 |
| A2 | 930 | 1 | 35 | 600 | 5 |

TABLE 2-continued

| Example | Temperature of induction hardening (° C.) | Holding time of induction hardening (min) | Cooling temperature of oil quenching (° C.) | Heating temperature of induction tempering (° C.) | Holding time of induction tempering (min) |
|---|---|---|---|---|---|
| A3 | 940 | 2 | 35 | 650 | 4 |
| A4 | 920 | 4.5 | 40 | 550 | 4.5 |
| A5 | 920 | 3.5 | 35 | 600 | 3.5 |
| A6 | 900 | 1.5 | 35 | 630 | 3 |
| A7 | 890 | 5 | 50 | 550 | 2.5 |
| A8 | 870 | 1.5 | 35 | 530 | 2 |
| A9 | 850 | 5 | 35 | 520 | 1.5 |

The sucker rod steels of the above Examples were sampled and manufactured into sucker rods. The sucker rods were subjected to various performance tests, and the performance parameters obtained from the tests are listed in Table 3.

Table 3 lists the performance parameters of the sucker rods made of the sucker rod steels of the Examples.

TABLE 4

| Example | Tensile strength (MPa) | impact energy AKU2(J) | Grain size (grade) |
|---|---|---|---|
| A1 | 1310 | 190 | 10 |
| A2 | 1070 | 210 | 11 |
| A3 | 1000 | 220 | 10 |
| A4 | 1275 | 198 | 10 |
| A5 | 1090 | 230 | 11 |
| A6 | 975 | 208 | 11 |
| A7 | 1250 | 209 | 11 |
| A8 | 1090 | 210 | 11 |
| A9 | 980 | 206 | 10 |

Note: AKU2 was measured by GB229 metal Charpy notched impact test method, Aku2 represents the impact absorbing energy of a U-notch sample with a depth of 2 mm, and the unit is J.

As can be seen from Table 3, the sucker rod steels of the Examples of the present invention have a grain size higher than grade 10, a tensile strength of 920~1320 MPa and an Aku2 of 180 J or more, which greatly satisfy the use requirements of the oil well.

FIG. 1 is a photograph showing the metallographic structure of the sucker rod steel of Example 5. As can be seen from FIG. 1, the microstructure of the sucker rod steel of Example 5 is tempered martensite and nanoscale precipitates.

Figure 2:
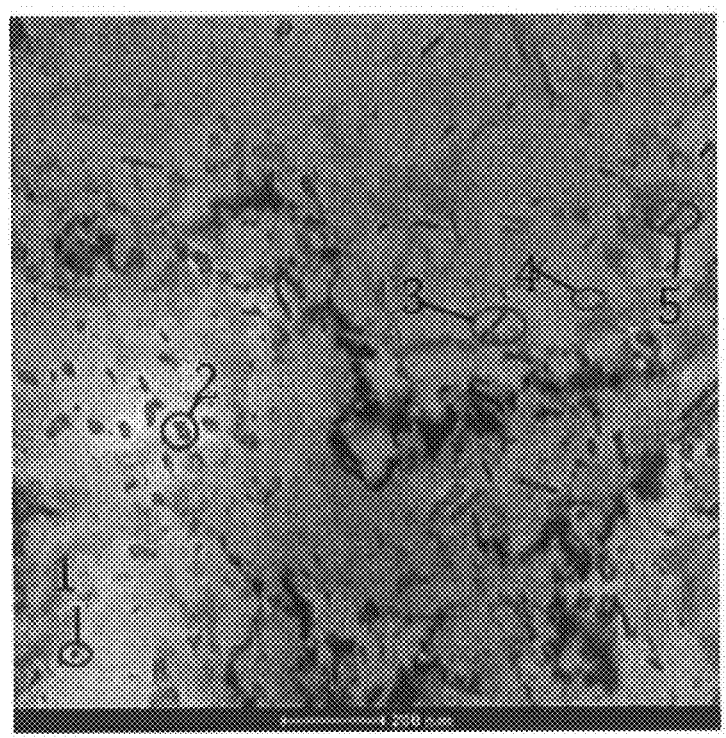
FIG. 2 is a photograph showing the metallographic structure of the nanoscale precipitates of the sucker rod steel of Example A5.

The nanoscale precipitates can be further referred to FIG. 2. FIG. 2 is a photograph showing the metallographic structure of the nanoscale precipitates of the sucker rod steel of Example 5. As can be seen from FIG. 2, the sucker rod steel of Example 5 precipitates a large amount of nanoscale precipitates, and the nanoscale precipitates include granular precipitates 1, 2 and short rod-shaped precipitates 3, 4, 5. Among them, the granular precipitates 1 and 2 are carbonitrides of Cr, Mn, and Nb, and the short rod-shaped precipitates 3, 4 and 5 are carbonitrides of Cr and Fe.

It should be noted that the above are merely illustrative of specific Examples of the invention. It is obvious that the present invention is not limited to the above Examples, but has many similar variations. All modifications that are directly derived or associated by those skilled in the art are intended to be within the scope of the present invention.

The invention claimed is:

1. A sucker rod steel, comprising the following chemical elements in mass percent: C: 0.10~0.20%, Si: 0.40~0.80%, Mn: 0.20~0.60%, Mo: 0.36~0.46%, Cr: 6.15~6.97%, Al: 0.015~0.035%, Nb: 0.02~0.06%, and N: 0.008~0.015%, with the balance being Fe and other inevitable impurities, wherein the microstructure of the sucker rod steel is tempered martensite and nanoscale precipitates and the precipitates include carbonitrides of Cr and Fe, wherein the sucker rod steel has a tensile strength of 920~1320 MPa.

2. The sucker rod steel according to claim 1, wherein the nanoscale precipitates comprise granular precipitates.

3. The sucker rod steel according to claim 2, wherein the granular precipitates have a particle size of 10~20 nm.

4. The sucker rod steel according to claim 2, wherein the granular precipitates comprise carbonitrides of Cr, Mn and Nb.

5. The sucker rod steel according to claim 1, wherein the carbonitrides of Cr and Fe are rod-shaped.

6. The sucker rod steel according to claim 5, wherein the precipitates have a length of 60~80 nm and a width of 10~20 nm.

7. The sucker rod steel according to claim 1, wherein the sucker rod steel has a grain size of higher than grade 10.

8. The sucker rod steel according to claim 1, wherein the sucker rod steel has an AKU2 of 180 J or more.

9. A heat treatment process of the sucker rod steel according to any one of claims 1 to 6, 7 and 8, comprising the steps of:
    induction hardening: passing the sucker rod steel through an intermediate frequency induction heater to heat the sucker rod steel to 850~950° C. and keep for a holding time of 1~5 min, and then cooling the sucker rod steel by oil quenching at an oil temperature of 20~50° C.;
    induction tempering: passing the sucker rod steel through an intermediate frequency induction heater to heat the sucker rod steel to 520~650° C. and keep for a holding time of 1.5~5 min, and then air cooling the sucker rod steel to room temperature.

10. The heat treatment process according to claim 9, wherein, in the step(s) of the induction hardening and/or the induction tempering, passing the sucker rod steel through an intermediate frequency induction heater with a frequency of 20~30 KHz at a speed of 0.5~1 m/min.

11. A method for manufacturing sucker rod steel, comprising the heat treatment process according to claim 9.

12. A method for manufacturing sucker rod steel, comprising the heat treatment process according to claim 10.

* * * * *